(12) United States Patent
Oh et al.

(10) Patent No.: US 6,714,789 B1
(45) Date of Patent: Mar. 30, 2004

(54) METHOD AND SYSTEM FOR INTER-FREQUENCY HANDOFF AND CAPACITY ENHANCEMENT IN A WIRELESS TELECOMMUNICATIONS NETWORK

(75) Inventors: Dae-Sik Oh, Overland Park, KS (US); Brian White, Olathe, KS (US)

(73) Assignee: Sprint Spectrum, L.P., Overland Park, KS (US)

( * ) Notice: Subject to any disclaimer, the term of this patent is extended or adjusted under 35 U.S.C. 154(b) by 370 days.

(21) Appl. No.: 09/664,292

(22) Filed: Sep. 18, 2000

(51) Int. Cl.[7] .............................. H04Q 7/22; H04Q 7/20
(52) U.S. Cl. ........................... 455/456.1; 455/422.1; 455/440; 455/450
(58) Field of Search ........................... 455/62, 450, 440, 455/452, 456.5, 436, 437, 438, 457, 456.1, 422.1; 707/208; 370/328, 329, 341

(56) References Cited

U.S. PATENT DOCUMENTS

| | | | | |
|---|---|---|---|---|
| 4,765,753 A | * | 8/1988 | Schmidt | 370/332 |
| 5,392,331 A | * | 2/1995 | Patsiokas et al. | 455/442 |
| 5,459,759 A | * | 10/1995 | Schilling | 455/422.1 |
| 5,539,744 A | * | 7/1996 | Chu et al. | 370/397 |
| 5,650,770 A | | 7/1997 | Schlager et al. | |
| RE35,916 E | * | 10/1998 | Dennison et al. | 455/456.3 |
| 5,901,354 A | * | 5/1999 | Menich et al. | 455/442 |
| 5,963,130 A | | 10/1999 | Schlager et al. | |
| 6,075,989 A | * | 6/2000 | Moore et al. | 455/436 |
| 6,088,694 A | * | 7/2000 | Burns et al. | 707/8 |
| 6,151,498 A | * | 11/2000 | Roel-Ng et al. | 455/433 |
| 6,198,390 B1 | | 3/2001 | Schlager et al. | |
| 6,324,404 B1 | * | 11/2001 | Dennison et al. | 455/456.1 |
| 6,360,098 B1 | * | 3/2002 | Ganesh et al. | 455/436 |
| 6,363,255 B1 | * | 3/2002 | Kuwahara | 455/456.5 |
| 6,473,619 B1 | * | 10/2002 | Kong et al. | 455/456 |

* cited by examiner

Primary Examiner—Sinh Tran
Assistant Examiner—Kamran Afshar

(57) ABSTRACT

A method and system for allocating air interface resources in a wireless telecommunications network. A control entity determines the current or projected location of a mobile station. Using the location, the control entity identifies the physical sectors and respective carrier frequencies available to serve the mobile station. The control entity then selects an optimal physical sector and respective carrier frequency and instructs the mobile station to operate in the selected physical sector using the selected carrier frequency.

18 Claims, 5 Drawing Sheets

METHOD AND SYSTEM FOR INTER-FREQUENCY HANDOFF AND CAPACITY ENHANCEMENT IN A WIRELESS TELECOMMUNICATIONS NETWORK

BACKGROUND

1. Field of the Invention

The present invention relates to wireless telecommunications systems and more particularly to the allocation of air interface resources in such a system.

2. Description of Related Art

In a typical cellular radio communications system (wireless telecommunications network), an area is divided geographically into a number of cell sites, each defined by a radio frequency (RF) radiation pattern from a respective base transceiver station (BTS) antenna. The base station antennae in the cells are in turn coupled to a base station controller (BSC), which is then coupled to a telecommunications switch or gateway, such as a mobile switching center (MSC) for instance. The MSC may then be coupled to a telecommunications network such as the PSTN (public switched telephone network) or the Internet.

When a mobile station (MS) (such as a cellular telephone, pager, or appropriately equipped portable computer, for instance) is positioned in a cell, the MS communicates via an RF air interface with the BTS antenna of the cell. Consequently, a communication path is established between the MS and the telecommunications network, via the air interface, the BTS, the BSC and the MSC.

With the explosive growth in demand for wireless communications, the level of call traffic in most cell sites has increased drastically over recent years. To help manage the call traffic, most cells in a Wireless network are usually further divided geographically into a number of sectors, each defined respectively by radiation patterns from directional antenna components of the respective BTS, or by respective BTS antennae. These sectors (which can be visualized ideally as pie pieces) can be referred to as "physical sectors," since they are physical areas of a cell site. Therefore, at any given instance, an MS in a wireless network will typically be positioned in a given physical sector and will be able to communicate with the telecommunications network via the BTS serving that physical sector.

In a CDMA (code division multiple access) system, each cell site may employ one or more carrier frequencies for communication with the mobile stations that are in its boundaries. The number of carrier frequencies employed by a given cell site may depend on various factors, such as the density of communication traffic expected in the site, for instance. In a congested city area, for example, a given cell site might be designed to employ three or four carrier frequencies, while, in a sparsely populated rural area, a cell site might employ only one or two carrier frequencies.

When a cell site employs more than one carrier frequency, the cell cite may be considered to have a multiple of its number of physical sectors. For instance, if a cell site is divided physically into three sectors by directional antenna elements, and the cell site employs four carrier frequencies, then the cell site may effectively have twelve sectors, three operating at each of the four carrier frequencies. (Variations on this arrangement are, of course, possible as well.) For convenient reference, these sectors may be referred to as "frequency-sectors", since each sector could vary from another by its carrier frequency and its physical location.

Each physical sector in a CDMA system is also distinguished from adjacent physical sectors by a PN offset number or key. When a mobile station is present in a given physical sector, communications between the mobile station and the BTS of the cell site are encoded by the physical sector's PN offset key, regardless of the carrier frequency being used.

In normal operation, when a mobile station is engaged in a call on a given frequency and the mobile station moves into a new physical sector, the call will continue on that same frequency in the new physical sector. Through communication with a base station controller, the mobile station will simply switch to use the PN offset key of the new physical sector in order to complete the handoff from one physical sector to the next.

SUMMARY

The present invention stems from a realization that problems can exist in the normal allocation of air resources as described above. For example, in many cases, a new physical sector into which a mobile station roams may not employ the same carrier frequency as the physical sector from which the mobile station came. (This often occurs, for instance, when a mobile station moves from a city area into a rural area where fewer carrier frequencies are provided.) In that scenario, the mobile station most likely drop the call, because communications on the carrier frequency that the mobile station was using will be discontinued.

As a possible solution to this problem, a pilot beacon can be used to emit communications signals into a physical sector on carrier frequencies that would otherwise be unavailable in that physical sector. With this arrangement, when a mobile station moves from a physical sector using a given carrier frequency into another physical sector in which that carrier frequency is not available, signals can still be sent to the mobile station on that carrier frequency in order instruct the mobile station to switch to a carrier frequency that is available in the new physical sector. Unfortunately, however, such pilot beacons are expensive. Therefore, this solution is not desirable.

A problem of a different type can also arise even when a mobile station moves between physical sectors that share the carrier frequency being used by the mobile station. For instance, a mobile station, might move from a first physical sector operating on carrier frequency A to a second physical sector operating on carrier frequency B However, it is possible that carrier frequency A in the second physical sector is exceptionally congested with mobile station traffic at the moment. Consequently, as the mobile station enters the second physical sector and continues to communicate on carrier frequency A, the quality of communications on that carrier in the second physical sector could be quite poor, and the added traffic could result in dropped calls as well. In this instance, it is possible that another carrier frequency B also employed in the second physical sector is not particularly congested at the moment. Therefore, it might be more efficient if the mobile station would change to carrier B as it moves into the second physical sector, thereby avoiding the increase in congestion on carrier A.

As still another example, as a mobile station moves from one cell site to another, the mobile station will typically pass through an area where the two cell sites (and consequently at least two physical sectors) overlap. In that transitional area, a choice must be made as to whether the mobile station should continue to communicate with the first cell site or should instead communicate with the second cell site. In existing systems, as the mobile station moves progressively further away from the BTS of the first cell site, the mobile station will continue to increase its transmission power in order to stay in touch with the BTS of the first cell site. Unfortunately, however, that increase in power could effectively raise the noise level in the first cell site (as higher power signals are transmitted within the cell) and could consequently reduce capacity in the first cell site. It is possible that some other carrier frequency in either the first or second cell site could be far less congested and subject to less interference from high transmission levels of the mobile station. Therefore, it might be more efficient if the mobile station would use that other carrier instead.

An exemplary embodiment of the present invention can help solve the foregoing problems, by seeking to optimize the allocation of air interface resources in a wireless network. In an exemplary embodiment, a network entity uses information about the location of a mobile station, together with information about actual congestion on various carrier frequencies in areas of a wireless network, to determine (i) when communications with a mobile station can be switched to a different carrier frequency, (ii) when communications with the mobile station should be switched to a different carrier frequency, and (iii) to which carrier frequency the communications should be switched.

As a general matter, information about the location of a mobile station may be collected and monitored. The information can be regularly collected by the mobile station, for instance, through use of a GPS (global positioning system) receiver or other technology, and the mobile station can regularly provide the information to a controller in the network. Alternatively, the information may be collected by any of a number of other methods. The controller may monitor this information to determine when a situation exists where the mobile station could be switched to a different carrier frequency. For instance, if the mobile station is in, or is moving into, an area that employs multiple carrier frequencies, the controller may determine that an option exists to switch the mobile station to another frequency.

When the controller determines that an option exists to use another carrier frequency for communications with the mobile station, the controller conducts (or causes to be conducted) an analysis to select what it finds to be an optimal carrier frequency. This analysis may be as simple as determining which carrier frequency in the area at issue is least congested at the moment, or the analysis could be more complex, taking into consideration factors such as power levels, noise levels and the like.

If the optimal carrier frequency is the frequency on which the mobile station is already operating, then the controller need take no further action. Alternatively, if the optimal carrier frequency is a frequency other than that on which the mobile station is currently operating, then the controller may orchestrate a handoff of the mobile station to the optimal frequency.

These as well as other aspects and advantages of the present invention will become apparent to those of ordinary skill in the art by reading the following detailed description, with appropriate reference to the accompanying drawings.

BRIEF DESCRIPTION OF THE DRAWINGS

An exemplary embodiment of the present invention is described herein with reference to the drawings, in which.

DETAILED DESCRIPTION OF EXEMPLARY EMBODIMENT

1. Network Architecture

Figure 1:
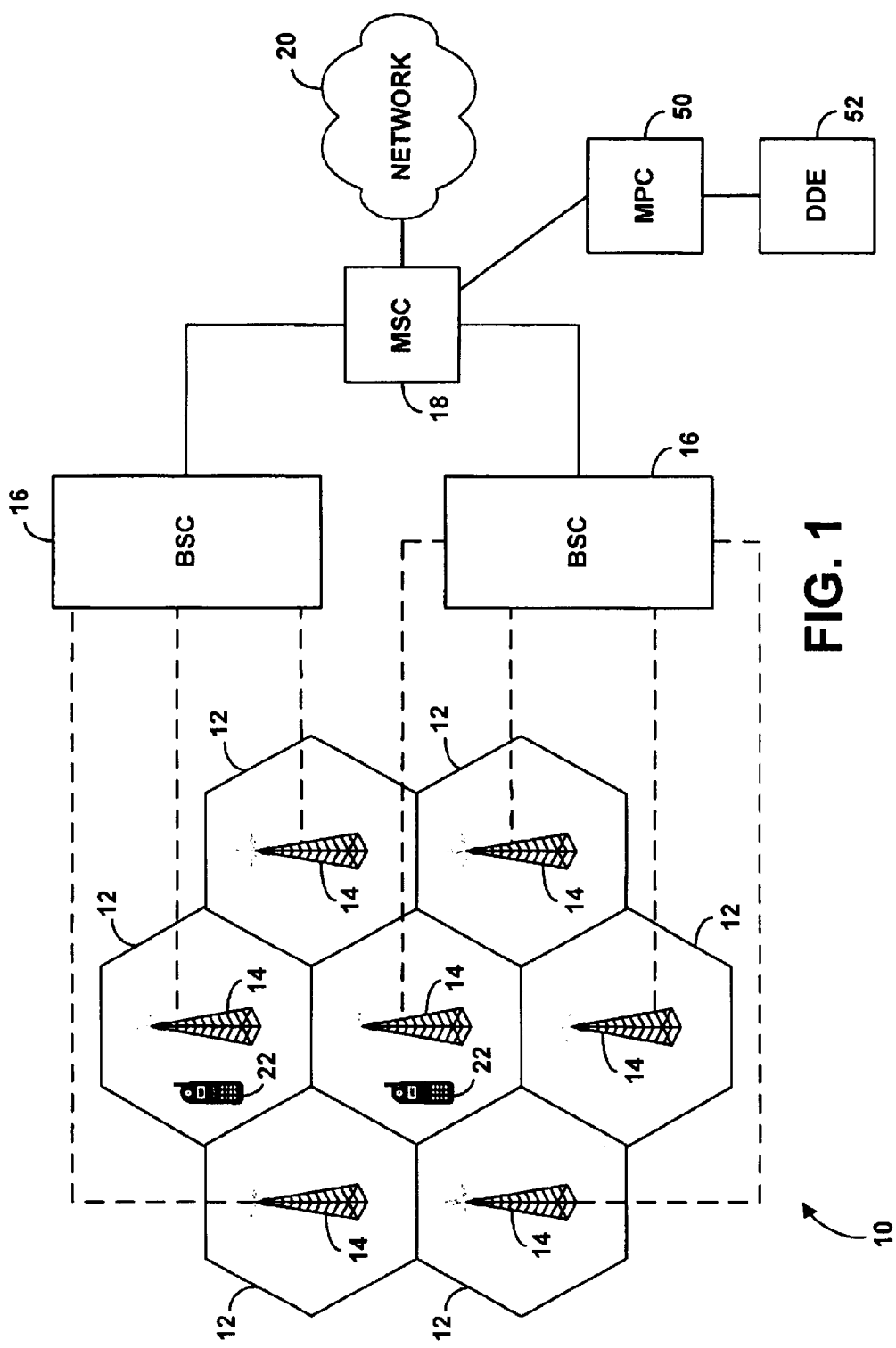
FIG. 1 is a block diagram illustrating a wireless telecommunications network arranged to employ an exemplary embodiment of the invention.

Referring to the drawings, FIG. 1 illustrates a simplified block diagram of a wireless telecommunications network 10 in which an exemplary embodiment of the present invention can be employed. As shown in FIG. 1, network 10 includes multiple cells or cell sites 12, each of which is defined by an RF radiation pattern from a respective BTS 14. FIG. 1 depicts each of the cells in an idealized fashion, as a hexagon that does not overlap other cells. In reality, however, most cells will overlap with neighboring cells and, due to topography, signal strength and other factors, may vary widely in shape and size.

In network 10, the BTS 14 of each cell site communicates with a BSC 16, which in turn communicates with an MSC or gateway 18. The MSC then communicates with a network, such as the PSTN or the Internet for instance. (Other intermediate elements may be provided as well.) In a typical arrangement, the BTS of a cell site manages the air interface between the BTS and a mobile station that is currently operating in the cell site. FIG. 1 depicts two mobile stations 22 by way of example. Each BTS is in turn controlled by a BSC, and each BSC is then controlled by an MSC.

The MSC may thus serve as a general control element for network 10. Typically, it is responsible for setting up and switching calls to and from the cells, providing for backup, interfacing with the telecommunications network, monitoring traffic to facilitate billing, performing testing and diagnostic services, and performing other network management functions. The BSC, in turn, is usually responsible for managing handoff of signaling and call traffic as a mobile station moves from one physical cell site to another in network 10 for instance. In addition, the BSC is typically responsible for controlling power levels and frequency allocation for the air interface between the BTS and mobile stations.

Of course, this and other arrangements described herein are illustrative only, and other arrangements and other elements (e.g., machines, interfaces, functions, etc.) can be used instead and some elements may be omitted altogether. Further, as in most telecommunications applications, those skilled in the art will appreciate that many of the elements described herein are functional entities that may be implemented as discrete components or in conjunction with other components, in any suitable combination and location.

For example, although FIG. 1 depicts the BSC and MSC as separate entities, the BSC functions are often integrated into the MSC, thereby eliminating the separate BSC entity. As another example, although FIG. 1 shows the BSC and BTS as separate entities, these two entities could be co-located or could otherwise be viewed cooperatively as a base station system (BSS). As still another example, while FIG. 1 shows the BTSs grouped under the control of two BSCs, all of the BTSs in FIG. 1 could instead be controlled by a common BSC. Further, as another example, the MSC or gateway 18 may instead be controlled by another entity, such as a session manager for instance. Other arrangements are possible as well.

2. Cells and Sectors

Figure 2:
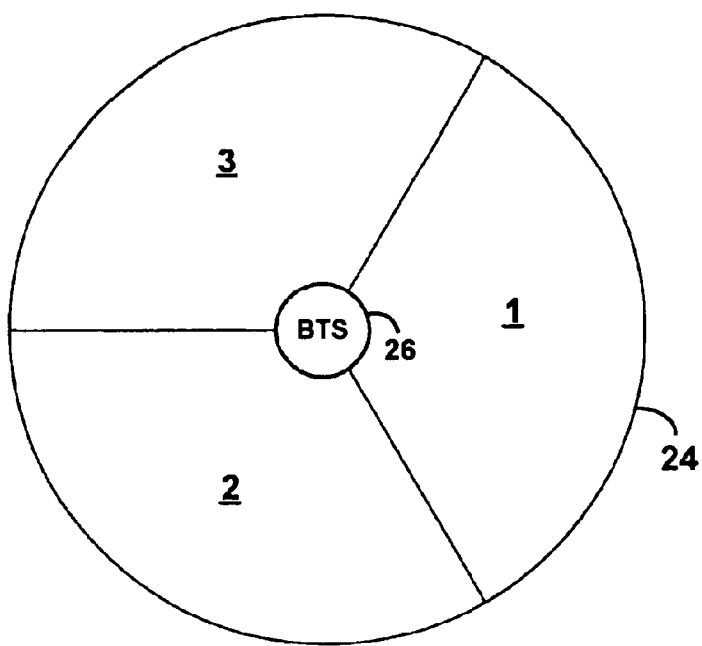
FIG. 2 is an idealized representation of a single cell in a wireless telecommunications network.

Referring next to FIG. 2, an exemplary cell 24 is shown in greater detail, idealized as a circle. As illustrated in FIG. 2, cell 24 has three physical sectors 1, 2 and 3, although a cell could instead have more or fewer sectors. Typically, the physical sectors are defined by directional radiation patterns from antenna elements (not shown) on a BTS 26 located at the center of the cell. Ideally, the physical sectors will be physically discrete areas, but there may in fact be some overlap between the sectors even within a given cell.

As noted above, each cell in a CDMA network (by way of example) may employ one or more carrier frequencies for communicating with mobile stations that operate within its borders. Thus, cell 24 in FIG. 2, for instance, might employ carrier frequencies A, B, C and D. (The particular frequencies are not critical.) BTS 26 would thus be arranged to communicate via each of those carrier frequencies within each of the physical sectors 1, 2 and 3. As a result, in terms of communication traffic within cell 24, effectively twelve separate frequency-sectors exist: three on frequency A, three on frequency B, three on frequency C, and three on frequency D. For purposes of this description, these frequency-sectors may be designated as sectors A1, A2, A3, B1, B2, B3, C1, C2, C3, D1, D2 and D3.

Many mobile stations in cell 24 may communicate concurrently with BTS 26 on a given one of the carrier frequencies. On a given carrier frequency in a CDMA system, for instance, up to 64 communication channels exist, each distinguished by a unique "Walsh code." The channels include a pilot channel (Walsh code 0), a synch channel (Walsh code 32), a number of paging channels (Walsh codes 1 possibly through 7), and a number of traffic channels (any remaining Walsh codes).

Further, in a CDMA system, each physical sector in the cell is distinguished by a PN offset, which defines a sector-specific part of a pseudo-random number. Communications between a mobile station and the BTS on a given channel, in a given physical sector, and on a given carrier frequency, are encoded using the Walsh code of the channel and the PN offset of the physical sector and are then carried on the carrier frequency. Details of the mechanics involved in this coding and communication are well known to those of ordinary skill in the art and are therefore not described here.

The pilot channel may be used for establishing signal timing and conveying signal strength measurements to facilitate handoff between sectors. In particular, via the pilot channel, a mobile station may monitor the strength of signals coming from the sector in which it is operating and coming from neighboring sectors, and a network entity (such as a switch or the mobile station itself) may maintain a neighbor list indicating which sectors have signals strengths high enough that the sectors are able to serve the mobile station. That neighbor list is traditionally used to decide when to hand off a mobile station from one cell site to another.

The synch channel may be used to convey system identification and other system-specific information to mobile stations, to allow mobile stations to establish communication in the sector. The paging channels may be used to page a mobile station in order to determine whether the mobile station is available to receive a call. Further the paging channels may carry system information and call setup orders to facilitate establishment of calls with the mobile station. The traffic channels, in turn, may be assigned to individual mobile stations to carry call traffic.

When a mobile station is located in a given physical sector but is not engaged in a call (i.e., a call is not currently set up between the mobile station and another terminal), the mobile station is considered to be idle. In the idle mode, the mobile station will monitor the paging channel(s) of the sector in which it is located, and the BTS of the sector can send signals to the mobile station via the paging channel(s). In contrast, when the mobile station is engaged in a call, the mobile station is considered to be active. In the active mode, the mobile station is locked onto a traffic channel that the BTS assigns to the mobile station and can receive signals via that traffic channel.

Figure 3:
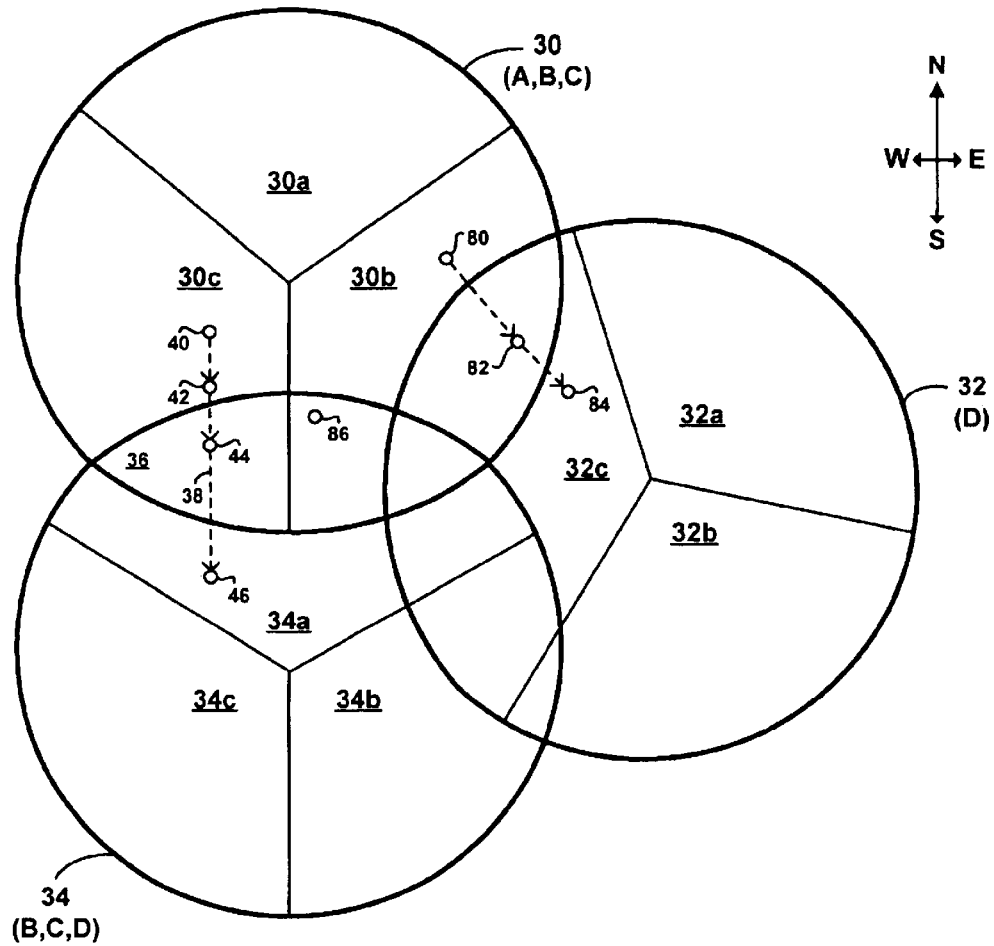
FIG. 3 is an idealized representation of an arrangement of three cells in which an exemplary embodiment of the invention can be advantageously employed.

Referring now to FIG. 3, three cells 30, 32 and 34 of a wireless network are illustrated. Cell 30 includes physical sectors 30a, 30b and 30c, cell 32 includes physical sectors 32a, 32b and 32c, and cell 34 includes physical sectors 34a, 34b and 34c. As described above, each of these cells may employ a certain number of carrier frequencies, which effectively multiplies the number of sectors defined by the cell to produce a number of frequency-sectors. For purposes of example, cell 30 might employ carriers A, B and C, cell 32 might employ only carrier D (typical in a rural area, for instance), and cell 34 might employ carriers B, C and D.

As is common in reality, the cells of FIG. 3 partially overlap each other in order to provide more full coverage for a given geographic area. Consequently, some of the physical sectors will overlap other physical sectors.

A mobile station may be located within a given one of these physical sectors and may be communicating with the BTS (not shown) of the respective cell on a given carrier frequency, in either idle or active mode. A user may then move the mobile station toward an area of overlap and then fully into a new physical sector. For instance, if a mobile station is located in physical sector 30c and is moving south, the mobile station will approach the area of overlap designated in FIG. 3 by reference numeral 36, will then enter area 36, and will then move fully into physical sector 34a. This trajectory is shown by dashed line 38 in FIG. 3.

Typically, as the mobile station in this example moves from physical sector 30c into physical sector 34a, the signal strength of physical sector 30c will decrease and the signal strength of physical sector 34a will increase. By convention, the mobile station may therefore ask the system to switch the mobile station over to communication with physical sector 34a instead from physical sector 30c, and a network entity (such as an MSC) in the system may then orchestrate the handoff. Alternatively, an MSC or other network entity may autonomously orchestrate the handoff, based on signal strength measurements.

In doing so, the network entity may send a frequency-assignment message to the mobile station, instructing the mobile station what carrier frequency to use when it switches to communicate in the new sector. Currently, the selection of which carrier frequency to switch a mobile station to is made substantially randomly (e.g., based on a function of the mobile station's mobile identification number). If the mobile station is idle, the network entity may send the frequency-assignment message via a paging channel. If the mobile station is active, the network entity may send the frequency-assignment message via the traffic channel on which the mobile station is currently assigned. The mobile station may then switch to that carrier frequency, synch with the new physical sector via the synch channel, and start to monitor the paging channel in the new physical sector.

3. Enhanced Handoff Leveraging Position Information

Figure 4:
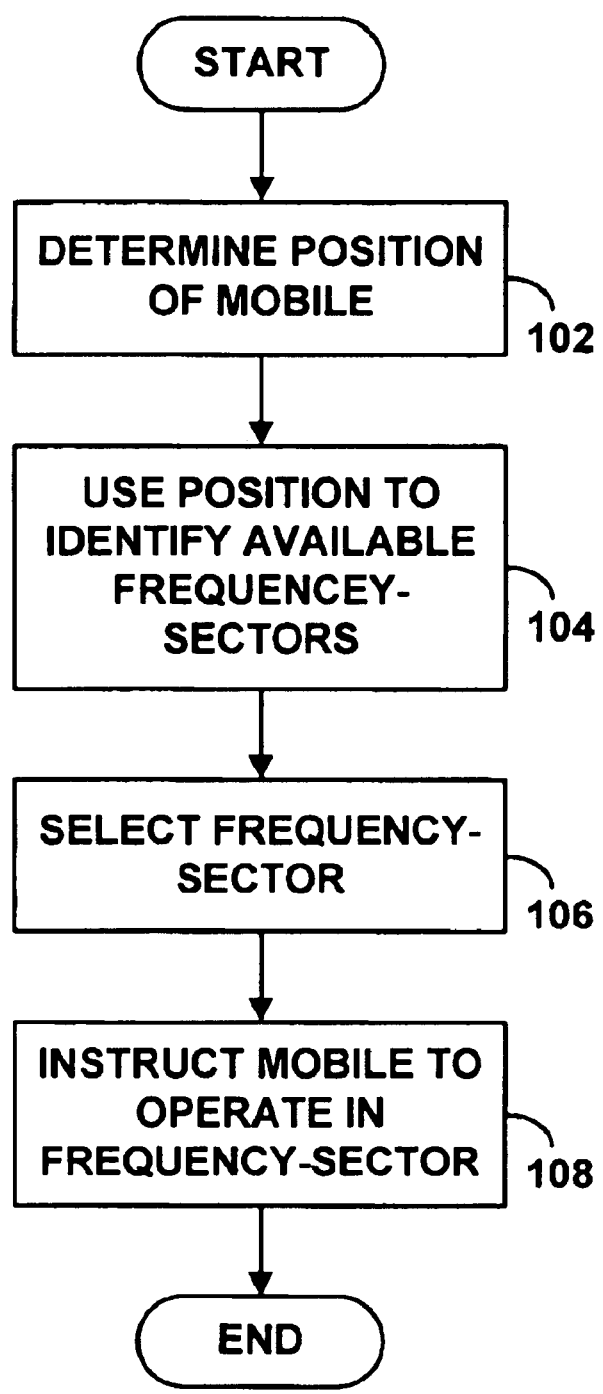
FIG. 4 is a flow chart depicting functions that may be employed in accordance with an exemplary embodiment of the invention.

As indicated above, in an exemplary embodiment, a controller uses information about the location of a mobile station, together with other information such as the extent of congestion on various carrier frequencies in areas of the network, to determine when communications with the mobile station can and should be switched to another carrier frequency. FIG. 4 provides a flow chart illustrating the functions that may be employed according to the exemplary embodiment.

As shown in FIG. 4, at step 102, a position of the mobile station is determined. At step 104, the position is used to identify a number of frequency-sectors that are available to serve the mobile station. At step 106, a preferred frequency-sector is selected from those identified. In turn, at step 108, the mobile station is instructed to operate in the preferred frequency-sector. In an exemplary embodiment, the mobile station is not instructed to operate in the preferred frequency-sector if it is already operating in that frequency-sector. However, other arrangement are possible as well.

The controller may reside on a single network entity or may, alternatively, be distributed among a number of network entities. By way of example, and without limitation, the controller may comprise an application executed by a processor on an MSC, BSC or other entity.

An MSC is particularly well situated to serve as the controller, because the MSC already serves as a general controller in the wireless network and therefore may already have access to information about (i) the identities and relative locations of the sectors that it serves and (ii) the extent of call traffic and noise levels in the sectors that it serves. Thus, in the exemplary embodiment, the MSC will be assumed to be the controller.

Figure 5:
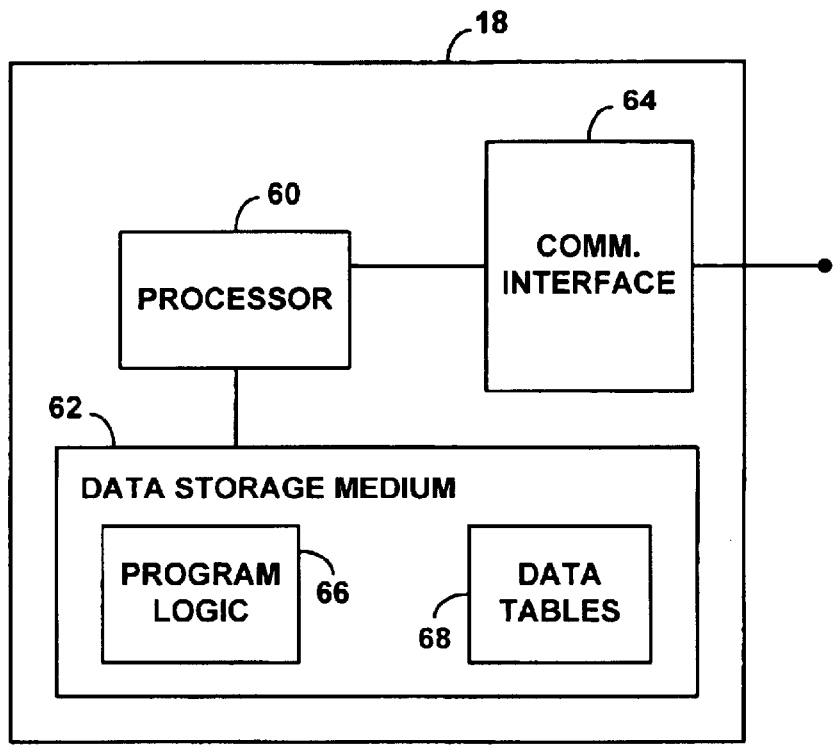
FIG. 5 is a block diagram illustrating functional blocks of a mobile switching center arranged to operate in accordance with an exemplary embodiment of the invention.

FIG. 5 is a simplified block diagram illustrating functional blocks of MSC 18 arranged in accordance with an exemplary embodiment of the invention. As shown in FIG. 5, MSC 18 includes a processor 60, a data storage medium 62, and a communication interface segment 64. Any or all of these components may themselves take the form of a number of similar or diverse components. Further, although not shown in FIG. 5, these components will likely be coupled together by a system bus.

Data storage medium 62 may take the form of a memory (e.g., RAM), and a non-volatile storage medium such as an optical or magnetic disk drive. As shown in FIG. 5, data storage medium 62 preferably includes a set of program logic 66 and a set of data tables 68. The program logic, for instance, may be a set of software instructions (i.e., sets of machine language instructions) that are stored on the disk drive and that can be loaded into memory and executed by processor 60 to perform various functions described herein. The communication interface segment 64 may, for instance, include an interface for communicating with BSCs 16 and the network 20.

In the exemplary embodiment, the MSC may maintain or otherwise have access to a record of the latitude and longitude coordinates that correspond to each of the frequency-sectors in the portion of the wireless network that the MSC serves. For instance, the MSC may maintain in data storage medium 62 or access via communication interface 64 one or more sector-location tables or another data file that has records keyed to latitude and longitude coordinates and that indicates which frequency-sectors encompass each given latitude and longitude coordinate.

Thus, for example, referring to cell 24 of FIG. 2, in which carrier frequencies A, B, C and D are employed, if a latitude/longitude coordinate is within physical sector 3, the sector-location table may indicate that the latitude/longitude coordinate is encompassed by frequency-sectors A3, B3, C3 and D3. Similarly, referring to FIG. 3, for example, if a latitude/longitude coordinate is located within area 36, then the sector-location table may indicate that the latitude/longitude coordinate is encompassed by frequency-sectors A30c, B30c, C30c, B34a, C34a and D34a.

The data in the sector-location table can be derived manually or with computer assistance by mapping out the locations of the physical sectors in the serving area, associating latitude/longitude coordinates with the boundaries of the physical sectors, and associating with each physical sector the carrier frequencies employed in the sector. A telecommunications service provider may store the sector-location table in a central repository for reference through out-of-band signaling by various MSCs in the service provider's network. Alternatively, the service provider may periodically load an updated sector-location table into each MSC or serving system.

In general, the physical sectors and frequency assignments (and therefore the frequency-sectors) of a given serving area will remain substantially constant over time. However, with changes in topography and signal strength, new measurements of sector coverage may need to be made, and the sector-location table may need to be updated accordingly.

In addition, the MSC may maintain in data storage medium 62 or otherwise have access to capacity information about each of the frequency-sectors in the area that the MSC serves. In the exemplary embodiment, this capacity information may include measurements of call traffic (congestion) and noise level (e.g., average signal-to-noise ratio) per frequency-sector. In the existing art, an MSC regularly logs measurements of call traffic (Erlang, i.e., number of hours of use) of various sectors in its serving area, to assist in allowing a service provider to re-engineer highly congested sectors for instance. Further, an MSC (or BSC, for example) typically logs noise level in each of its sectors. The MSC may have access to one or more sector-capacity tables or another data file that indicates the call traffic and noise level per each frequency-sector that the MSC serves.

According to an exemplary embodiment, a processor in the MSC may then be programmed with software or other instructions to collect information about the location of mobile stations within the frequency-sectors that the MSC serves. In this regard, any of a variety of methods now known or later developed can be employed to determine the location of a mobile station, preferably with a high level of granularity. Many such methods have been developed and are currently known in the art as a result of governmental mandates for conveying mobile station position coordinates. By way of example, Interim Standard 801 (TIA/EIA/IS-801) published by the Telecommunications Industry Association and entitled "Position Determination Standard for Dual-Mode Spread Spectrum Systems" (the entirety of which is hereby incorporated herein by reference) describes such procedures.

For example, each mobile station operating within the MSC's serving system may be equipped with a position-determining system and may be programmed to use the position-determining system to determine its own location coordinates. Each mobile station may then be programmed to report its own location, directly or through one or more other network entities (e.g., a mobile positioning center (MPC)), to the MSC. The mobile station may be programmed to report its location periodically (e.g., every 10–30 ms, for instance) or in response to a designated stimulus (e.g., a request from the MSC or another network entity).

In this regard, the well known GPS system currently provides very granular location determination and may provide even greater granularity in the future. Therefore, in an exemplary embodiment, the mobile station may include a GPS transceiver by which it may receive its location coordinates. Preferably, the GPS transceiver provides the mobile station with a substantially continuous or periodic reading of the latitude and longitude coordinates of the mobile station. A processor in the mobile station may then be programmed to periodically (e.g., every several seconds) report the mobile station's location directly or indirectly to the MSC.

Figure 6:
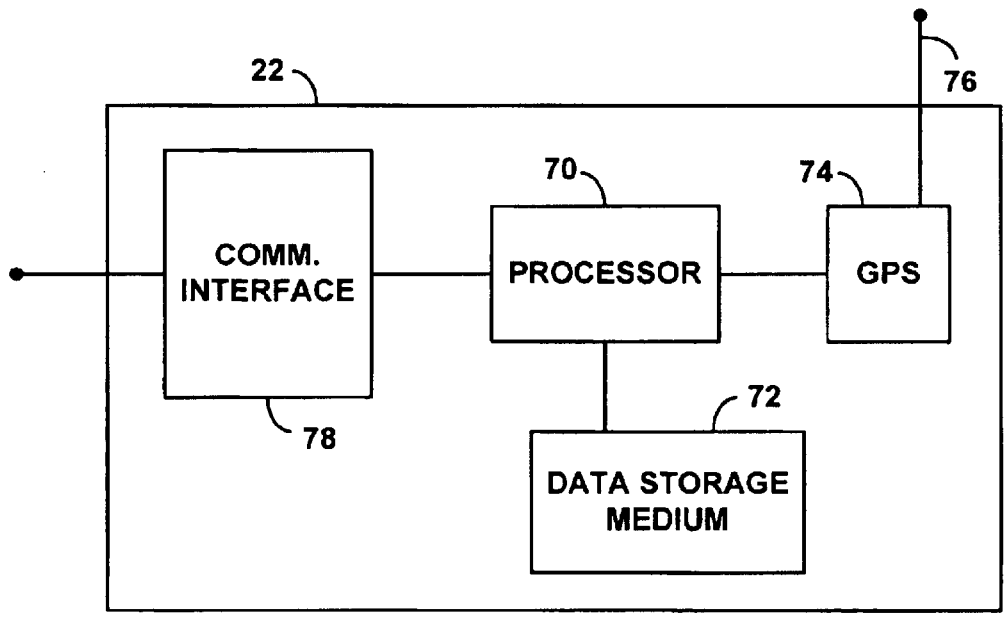
FIG. 6 is a block diagram illustrating functional blocks of a mobile station arranged to operate in accordance with an exemplary embodiment of the invention.

FIG. 6 is a simplified block diagram illustrating functional blocks of a mobile station 22 integrally including a GPS transceiver. As shown in FIG. 6, mobile station 22 includes a processor 70, a data storage medium 72, a GPS transceiver 74 and antenna 76, and a communication interface segment 78. The data storage medium 72 preferably includes program logic that can be executed by processor 70 to perform functions described herein, such as to control the GPS transceiver and to control communications between the mobile station and a BTS. The GPS transceiver 74 and antenna 76 are then preferably arranged to communicate with the global positioning satellite system, so as to provide the location of the mobile station as described above. The communication interface segment 78, in turn, may serve to facilitate communication via an air interface between the mobile station and a BTS.

A mobile station may send its location coordinates to the MSC via a suitable message in the pilot channel, paging channel, traffic channel or other available channel. According to EIA/TIA/IS-801, for instance, in a CDMA system, position determination data messages can be sent as data burst messages over a traffic channel or control channel. Other methods of communicating position information would be acceptable as well.

As another example, the location of each mobile station in the MSC's serving system can be determined by other position determining equipment or systems and reported via one or more network entities to the MSC. Examples of other position determining systems include triangularization and fingerprinting. Referring to FIG. 1, for instance, the MSC may be in communication with an MPC 50, which may, in turn be in communication with position determining equipment (PDE) 52. Position determining equipment may function to determine the location of each mobile station in the MSC's system and to report those locations to MPC 50. MPC 50 may then be programmed to periodically report the location of each such mobile station to the MSC. Alternatively, the MSC may be programmed to periodically query MPC for the location of each mobile station in the MSC's system. Other arrangements are possible as well.

For each mobile station that is operating in the MSC's serving system, as the MSC learns the location of the mobile station, the MSC may be programmed to record the mobile station's location in a location log file. In an exemplary embodiment, the MSC will obtain and record each mobile station's location periodically. The period may be approximately 20 ms or any other suitable duration. With improvements in processing speed and bandwidth or if otherwise possible, the period could be far smaller without a danger of overburdening the network.

The log file may take the form of one or more related database tables, for instance. As the mobile station moves physically throughout the network, the log file may therefore indicate a trajectory of the mobile station over time. Alternatively, if the mobile station does not move (or moves only minimally), then the log file may indicate simply a duration of the mobile station's presence in its current location or simply the fact that it is located there.

Further, each time the MSC records another location of a mobile station, or at other designated times (or in response to designated stimuli), the MSC may analyze the mobile station's location to determine whether the mobile station can and should be switched to a different carrier frequency. In this regard, the MSC may analyze both the mobile station's current location and, if the location log indicates that the mobile station is moving, for instance, a projected location based on the mobile station's trajectory.

a. Current Location

Given the current location of a mobile station, the MSC may refer to the sector-location table to determine what frequency-sectors are available to serve the mobile station. In this regard, the location information provided to the MSC will preferably take the same form (e.g., latitude/longitude coordinates) as the location information stored in the sector-location table. However, the MSC may be programmed to convert between location formats to facilitate a query of the sector-location table.

By reference to the sector-location table, the MSC may therefore obtain or otherwise establish a list of the frequency-sectors that are available to serve the mobile station. Referring to FIG. 3, for example, if a mobile station is physically at location 40, the MSC may query the sector-location table and thereby determine that the frequency-sectors available to serve the mobile station are: A30c, B30c and C30c. Alternatively, for example, if the mobile station is physically at location 44, the MSC may determine by reference to the sector-location table that the frequency-sectors available to serve the mobile station are: A30c, B30c, C30c, B34a, C34a and D34a. Still alternatively, for example, if the mobile station is physically at location 46, the MSC may determine by reference to the sector-location table that the frequency-sectors available to serve the mobile station are: B34a, C34a and D34a.

Note that this process amounts to an identification of physical sectors available to serve the mobile station and, additionally, an identification of carrier frequencies per physical sector available to carry communications with the mobile station. Consequently, when a mobile station is in a single physical sector rather than in an area of overlap between two physical sectors, the to process amounts to identifying the carrier frequencies available in that physical sector to carry communications with the mobile station.

The MSC may then refer to the sector-capacity table in an effort determine which of the identified frequency-sectors is most suitable for serving the mobile station. In doing so, the MSC may take into consideration the relative levels of capacity in each of the identified frequency-sectors and may, for instance, select the frequency-sector that has the least congestion or noise. Thus, for example, the MSC may compare relative levels of call traffic currently in each of the identified frequency-sectors. Alternatively, the MSC may compare the relative levels of noise in each of the identified frequency-sectors. Still alternatively, to select a preferred frequency-sector, the MSC may employ any function that takes into consideration call traffic, noise, and/or any aspect of the network resources and/or service level in the various frequency-sectors.

For instance, the MSC may retrieve from the sector-capacity table one or more pieces of capacity information about each of the identified frequency-sectors. For example, for each frequency-sector, the MSC may identify the sector's current level of call traffic in Erlangs. The MSC may then select the frequency-sector with the least call traffic. For instance, if the mobile station is currently located at location 40 in FIG. 3, the MSC may determine from the sector-capacity table that frequency-sectors A30*c*, B30*c* and C30*c* have call traffic levels X, Y and Z (e.g., 7.2, 6.2 and 8 Erlangs) respectively. The MSC may then select frequency-sector B30*c*, because it has the lowest level of call traffic at the moment.

In an exemplary embodiment, if the mobile station is not already operating in the selected frequency-sector (or in any event, regardless of whether the mobile station is operating in the selected frequency-sector), then the MSC may seek to orchestrate a handoff of the mobile station to the selected frequency-sector. This process may take various forms. If the mobile station is in the physical sector of which the frequency-sector is a member but is not operating on the carrier frequency of the frequency-sector, then this process may involve instructing the mobile station to switch to carrier frequency of the frequency-sector. If the mobile station is operating on the carrier frequency of the selected frequency-sector but is not within the physical sector of which the frequency-sector is a member, then this process may involve instructing the mobile station to switch to the physical sector, e.g., by switching to use a different PN offset. If the mobile station is both not in the physical sector of which the frequency-sector is a member and not operating on the carrier frequency of the frequency-sector, then this process may involve instructing the mobile station to switch to physical sector and to the carrier frequency.

The process of orchestrating a handoff may include sending to the mobile station a channel-assignment message. The channel assignment message may provide the mobile station with parameters indicative of the physical sector in which the mobile station should communicate (e.g., the PN offset of the physical sector) and/or the carrier frequency on which the mobile station should communicate. If the mobile station is active, then the MSC may send a channel-assignment message to the mobile station via its assigned traffic channel. Alternatively, if the mobile station is idle, then the MSC may send the channel-assignment message to the mobile station via the paging channel. Other means of communication can be used as well.

When the mobile station receives the channel-assignment message, the mobile station may responsively switch to communicate in the designated physical sector and on the designated frequency, as appropriate. (If the message instructs the mobile station to operate on a given carrier frequency on which the mobile station is already operating, for instance, then the mobile station may disregard that aspect of the message. Similarly, if the message instructs the mobile station to operate in a given physical sector in which the mobile station is already operating, then the mobile station may disregard that aspect of the message. Note that the channel-assignment message can be arranged omit any such superfluous information.)

In a CDMA system, the channel-assignment message may be carried in a Channel List Message as defined by Interim Standard 95 (TIA/EIA/IS-95) published by the Telecommunications Industry Association, the entirety of which is hereby incorporated by reference. The Channel List Message is normally used to notify a mobile station what traffic channel the mobile station should lock onto as the mobile station approaches the boundary of a cell or sector. In the context of the exemplary embodiment, the Channel List Message can be usefully employed to direct a switch to another physical sector and/or carrier frequency, even if the mobile station might not be approaching a boundary at the moment. Alternatively, the channel-assignment message may be carried in a Global Service Redirection message that is commonly used for inter-frequency handoff between digital (e.g., CDMA) and analog systems. Still other arrangement are possible as well.

b. Projected Location

Given a recent history of location of the mobile station, the MSC may establish a trajectory of the mobile station and may thereby identify a location to which the mobile station is headed. Alternatively, another entity (such as an MPC) may determine the trajectory of the mobile station and communicate a projected location to the MSC. With a knowledge of the location to which the mobile station is headed, the MSC may then consult the sector-location table to determine which frequency-sector(s) will be available to possibly serve the mobile station if and when the mobile station reaches the projected location. In turn, as above, the MSC may then refer to the sector-capacity table to select a preferred or optimal frequency-sector to serve the mobile station.

As the mobile station moves into the projected location, the MSC may then conveniently orchestrate a handoff of the mobile station to the selected frequency-sector. In particular, as described above, the MSC may employ an IS-95 Channel List Message or Global Service Redirection as the mobile station approaches the projected location.

For example, referring to FIG. 3, if the mobile station is at location 42, the MSC may determine by reference to the location log that the mobile station is on a trajectory along which the mobile station is about to head into area 36, which is an overlap of physical sectors 30*c* and 34*a*. Referring to the sector-location table, the MSC may then determine that, in area 36, frequency-sectors A30*c*, B30*c*, C30*c*, B34*a*, C34*a* and D34*a* are candidates to serve the mobile station. In turn, referring to the sector-capacity table, the MSC may determine that frequency-sector D34*a* is the least congested (in terms of traffic and noise, for instance). Therefore, as the mobile station moves to area 36, the MSC may orchestrate a handoff of the mobile station to frequency-sector D34*a*—i.e., to sector 34*a* and frequency D.

4. Examples

With the benefit of the present invention, a telecommunications service provider can more efficiently allocate air interface resources. Several examples will help to illustrate the operation of this invention in practice.

a. Travelling Into Sparse Sector

Referring to FIG. 3, assume that a mobile station is positioned a location 80 in physical sector 30*b* and is engaged in a call on carrier frequency A. Therefore, the mobile station is operating in frequency-sector A30*b*. Assume then that the mobile station travels southeast toward physical sector 32*c*. As noted above, exemplary cell 32 employs only carrier frequency D. Therefore, if the mobile station were to continue operating on carrier frequency A as it enters fully into physical sector 32*c*, the call would be likely be dropped.

With the benefit of the present invention, as the mobile station travels from location 80 to location 82 and onward, in the area of overlap of physical sectors 30*b* and 32*c*, the MSC may compile a location history indicating a trajectory of travel that will lead the mobile station to a projected location 84 that is fully in physical sector 32*c*. Based on that projected location, the MSC may find that the only available frequency-sector is D32c. Therefore, the MSC may conveniently orchestrate a handoff of the mobile station to frequency-sector D32c, i.e., to carrier frequency D, as the mobile station enters sector 32c.

b. Dynamically Adjusting Load

In FIG. 3, assume that a mobile station is located at location 86 in the area of overlap between physical sectors 30b and 34a, just inside the border of physical sector 34a, and that the mobile station is operating on carrier frequency B in physical sector 30b. At its location, the mobile station could theoretically communicate with either the BTS of cell 30 (via physical sector 30b) or the BTS of cell 34 (via physical sector 34a). However, to communicate with the BTS of cell, 34 would require the mobile station to use a higher power level than to communicate with the BTS of cell 32. The higher power level could cause noise problems for other entities in cell 34.

Nevertheless, based on the location of the mobile station, assume that the MSC identifies the available frequency-sectors and, by reference to the sector-load table, finds that all available carrier frequencies within physical sector 30b are fully loaded. To help alleviate those loads, the MSC might therefore opt to hand off the mobile station to physical sector 34a, maintaining communication on carrier B. Five minutes later, for instance, if the loads in physical sector 32 are less congested, the MSC might opt to switch the mobile station back to frequency-sector B30b, thereby allowing the mobile station to operate at a lower power level.

5. Exemplary Alternatives

An exemplary embodiment of the present invention has been described above. Those skilled in the art will understand, however, that changes and modifications may be made to this embodiment without departing from the true scope and spirit of the present invention, which is defined by the claims.

For example, while the foregoing description is presented in terms of cells and sectors, the method and system for allocating air interface resources can be applied equally for any area of a wireless telecommunications network. As a general matter, for instance, some control entity can determine the position of a mobile station and can use the position to identify a number of frequency-areas (physical areas and respective frequencies) that are available to serve the mobile station. The control entity can further select a preferred frequency-area from among those identified then instruct the mobile station to operate in that frequency-area. Further, the invention can extend equally to use in networks other than CDMA networks.

Still further, the method and system could be applied at various levels of a network. For instance, referring to FIG. 1, the control entity may reside on a BSC 16 to allocate air interface resources between the cells served by that BSC. In turn, when a contest exists between the cells served by multiple BSCs, then the BSCs may turn to the MSC for resolution as described above. Other examples are possible as well.

We claim:

1. A method of allocating air interface resources in a wireless telecommunications network, the method comprising the steps of:

determining a projected geographic position of a mobile station;

using the projected geographic position to identify a plurality of frequency-sectors available to serve the mobile station;

selecting a preferred frequency-sector from the plurality of frequency-sectors; and instructing the mobile station to operate in the preferred frequency-sector, wherein determining the projected geographic position of the mobile station comprises obtaining location information from a mobile positioning center, wherein using the projected geographic position to identify a plurality of frequency-sectors available to serve the mobile station comprises referencing a data file that correlates positions with available frequency-sectors, and wherein instructing the mobile station to operate in the preferred frequency-sector comprises sending a channel-assignment message to the mobile station, wherein the channel-assignment message is selected from the group consisting of a channel list message and a global service redirection message.

2. The method of claim 1 wherein the preferred frequency-sector defines a physical sector and a carrier frequency, and wherein instructing the mobile station to operate in the preferred frequency-sector comprises instructing the mobile station to operate in the physical sector.

3. The method of claim 1 wherein the preferred frequency-sector defines a physical sector and a carrier frequency, and wherein instructing the mobile station to operate in the preferred frequency-sector comprises instructing the mobile station to operate on the carrier frequency.

4. The method of claim 2, wherein instructing the mobile station to operate in the preferred frequency-sector further comprises instructing the mobile station to operate on the carrier frequency.

5. The method of claim 1, further comprising sending the channel-assignment message to the mobile station via a paging channel, if the mobile station is in an idle mode.

6. The method of claim 1, further comprising sending the channel-assignment message to the mobile station via a traffic channel, if the mobile station is in an active mode.

7. A method of allocating air interface resources in a wireless telecommunications network, the method comprising the steps of:

determining a geographic position of a mobile station;

using the geographic position to identify a plurality of frequency-sectors available to serve the mobile station;

selecting a preferred frequency-sector from the plurality of frequency-sectors; and instructing the mobile station to operate in the preferred frequency-sector, wherein determining the geographic position of the mobile station comprises obtaining location information from a mobile positioning center, wherein selecting the preferred frequency-sector comprises selecting a frequency-sector based at least in part on a measure of congestion in the preferred frequency-sector, and wherein instructing the mobile station to operate in the preferred frequency-sector comprises sending a channel-assignment message to the mobile station, wherein the channel-assignment message is selected from the group consisting of a channel list message and a global service redirection message.

8. The method of claim 7, wherein the mobile station includes a positioning system that identifies geographic location coordinates of the mobile station, and wherein determining the geographic position of the mobile station comprises receiving the geographic location coordinates from the mobile station.

9. The method of claim 7, wherein determining the geographic position of the mobile station comprises receiving geographic location coordinates of the mobile station.

10. The method of claim 7, wherein the geographic position of the mobile station comprises a projected geographic position of the mobile station.

11. The method of claim 7, wherein selecting the preferred frequency-sector comprises selecting a frequency-sector that has a lowest level of call traffic of plurality of available frequency-sectors.

12. The method of claim 7, wherein selecting the preferred frequency-sector based at least in part on a measure of congestion in the preferred frequency-sector comprises referencing a data file that correlates frequency-sectors with measures of congestion.

13. A system for allocating air interface resources in a wireless telecommunications network, the system comprising, in combination:

a processor;

a data storage medium;

a first set of machine language instructions stored in the data storage medium and executable by the processor to use a projected geographic position of a mobile station to identify a plurality of frequency-sectors available to serve the mobile station;

a second set of machine language instructions stored in the data storage medium and executable by the processor to select a preferred frequency-sector from the plurality of frequency-sectors;

a third set of machine language instructions stored in the data storage medium and executable by the processor to instruct the mobile station to operate in the preferred frequency-sector by sending a channel-assignment message selected from the group consisting of a channel list message and a global service redirection message; and a data file that correlates positions with available frequency-sectors, wherein the first set of machine language instructions is executable to reference the data file so as to identify available frequency-sectors corresponding to the projected geographic position of the mobile station, wherein the projected geographic position is determined by a process comprising obtaining location information from a mobile positioning center.

14. The system of claim 13, further comprising a positioning system for determining the geographic position of the mobile station.

15. The system of claim 14, wherein the positioning system is integrated with the mobile station, the positioning system providing geographic coordinates indicative of the geographic position of the mobile station.

16. A system for allocating air interface resources in a wireless telecommunications network, the system comprising, in combination:

a processor;

a data storage medium;

a first set of machine language instructions stored in the data storage medium and executable by the processor to use a geographic position of a mobile station to identify a plurality of frequency-sectors available to serve the mobile station;

a second set of machine language instructions stored in the data storage medium and executable by the processor to select a preferred frequency-sector from the plurality of frequency-sectors; and a third set of machine language instructions stored in the data storage medium and executable by the processor to instruct the mobile station to operate in the preferred frequency-sector by sending a channel-assignment message selected from the group consisting of a channel list message and a global service redirection message, wherein the second set of machine language instructions is executable to select the preferred frequency-sector based at least in part on a measure of congestion in the preferred frequency-sector, and wherein the geographic position is determined by a process comprising obtaining location information from a mobile positioning center.

17. The system of claim 16, further comprising a data file that correlates frequency-sectors with measures of congestion, wherein the second set of machine language instructions is executable to reference the data file so as to select the preferred frequency-sector based at least in part on a measure of congestion.

18. The system of claim 16, wherein the geographic position of the mobile station comprises a projected geographic position of the mobile station.

* * * * *